Feb. 27, 1923.
E. R. BURTNETT
1,446,875
PISTON VALVE RECIPROCATING SLEEVE FOR MANIFOLD SELECTIONS
Filed June 11, 1920
4 sheets-sheet 3
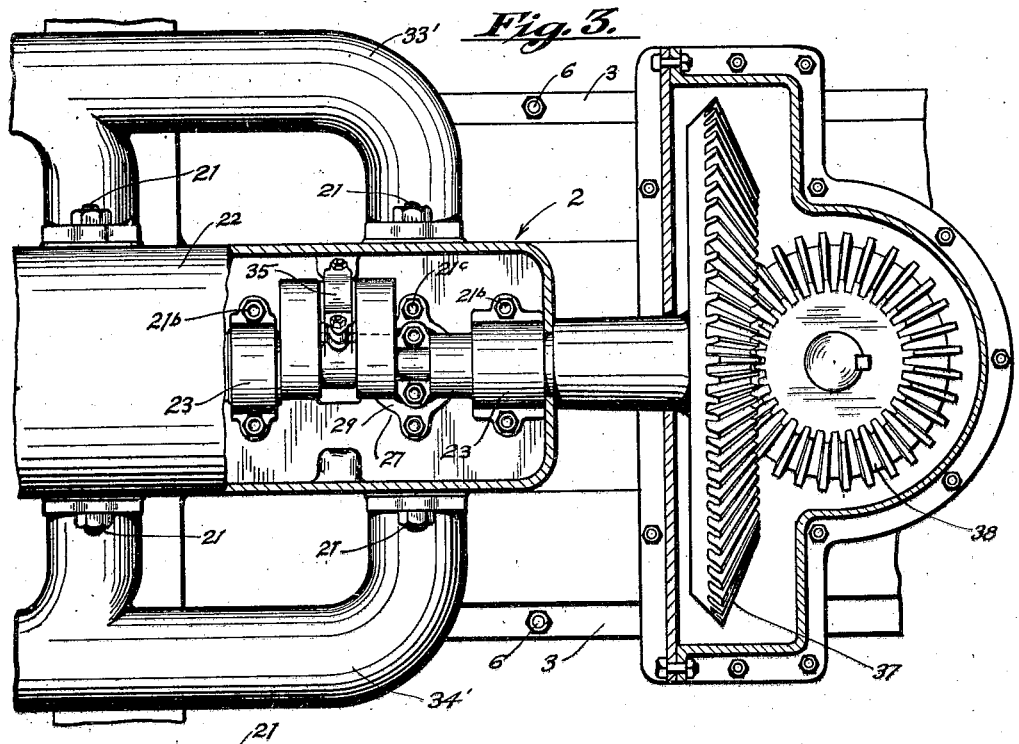
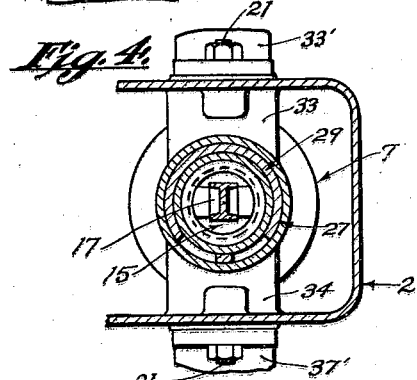
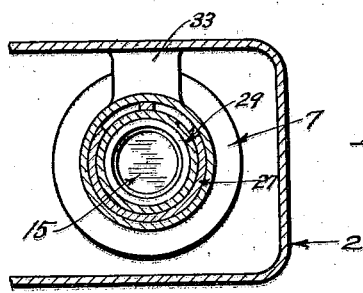
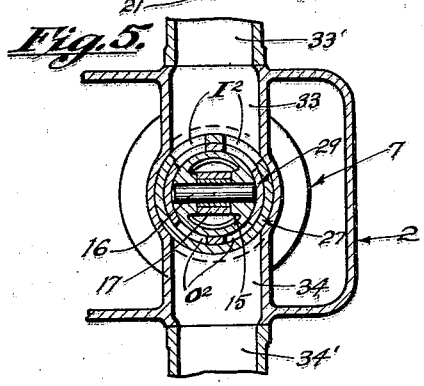
INVENTOR.
EVERETT R. BURTNETT
BY
Hazard & Miller
ATTORNEYS.

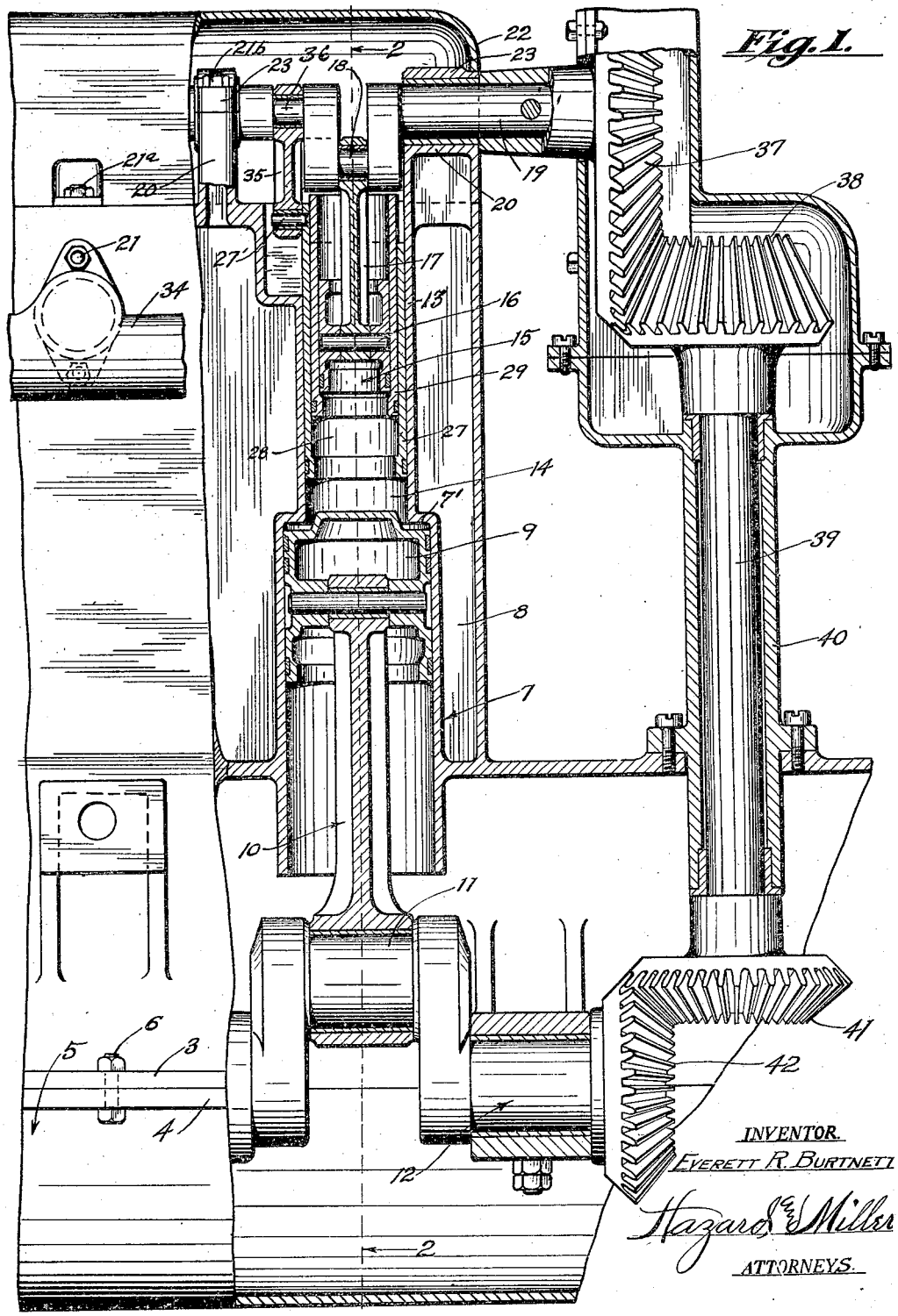

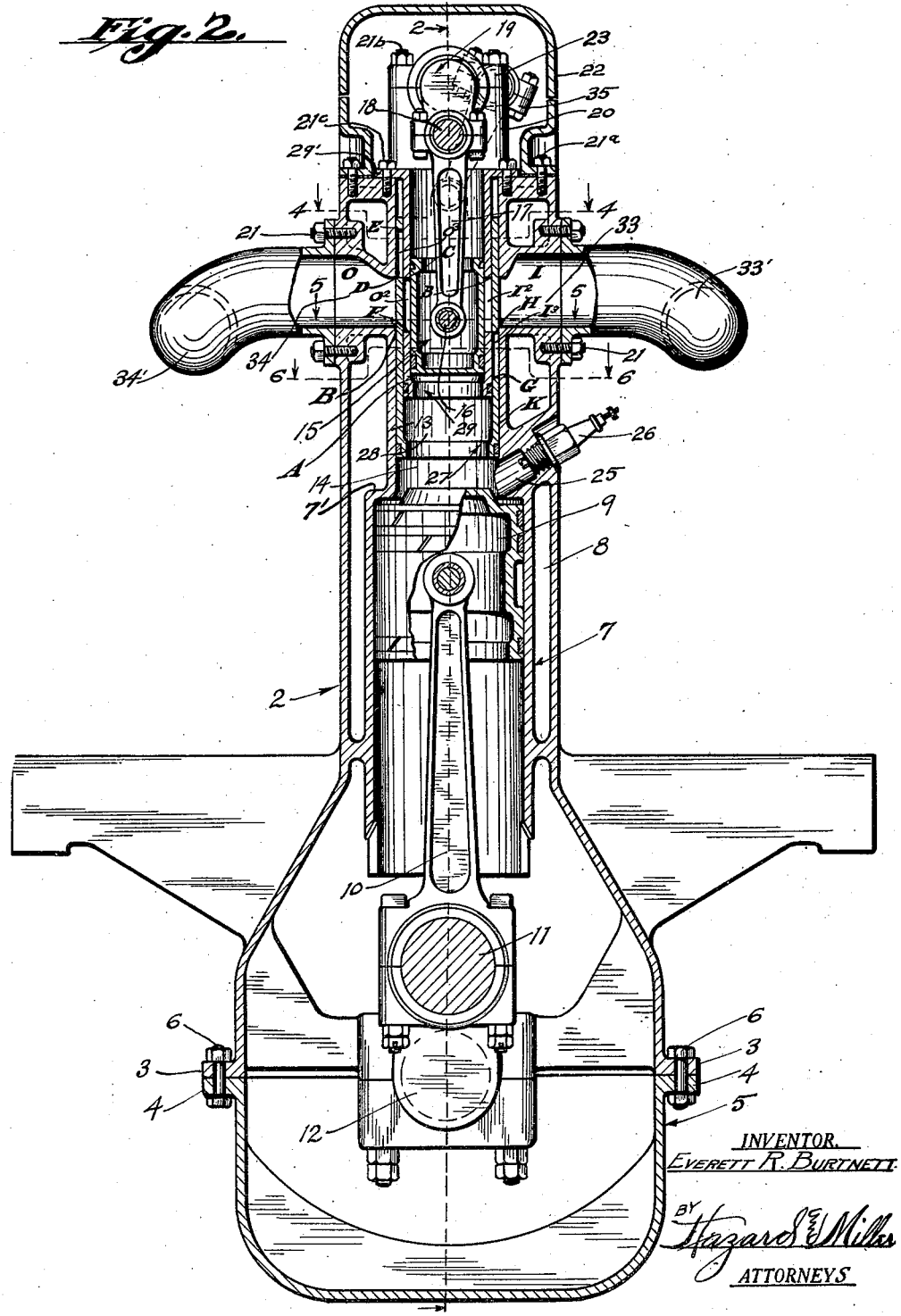

Feb. 27, 1923.  
E. R. BURTNETT  
1,446,875  
PISTON VALVE RECIPROCATING SLEEVE FOR MANIFOLD SELECTIONS  
Filed June 11, 1920  
4 sheets-sheet 4
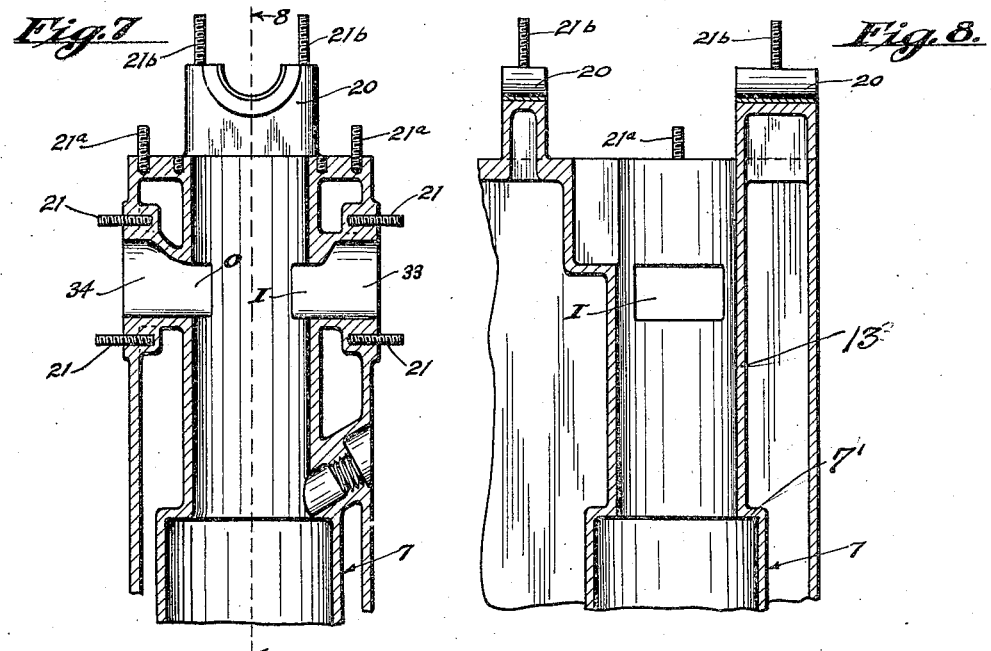
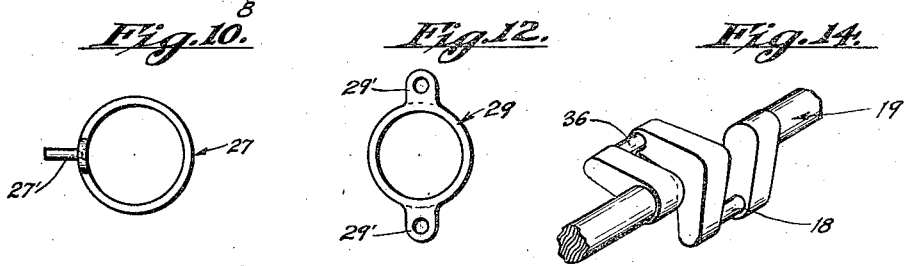
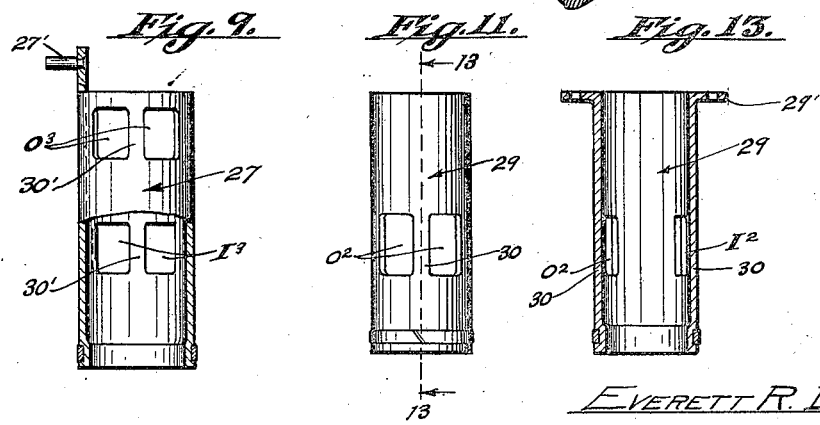
INVENTOR.  
EVERETT R. BURTNETT.  
BY  
*Hazard & Miller*  
ATTORNEYS.

Patented Feb. 27, 1923.

1,446,875

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

PISTON-VALVE RECIPROCATING SLEEVE FOR MANIFOLD SELECTIONS.

Application filed June 11, 1920. Serial No. 388,150.

*To all whom it may concern:*

Be it known that I, EVERETT R. BURTNETT, a citizen of the United States, residing at Los Angeles, in the county of Los Angeles and State of California, have invented new and useful Improvements in Piston-Valve Reciprocating Sleeves for Manifold Selections, of which the following is a specification.
This invention relates to prime motors and particularly to internal combustion engines having valve mechanism for the respective cylinders comprising a reciprocating sleeve valve co-operating with a piston valve reciprocating within said sleeve valve.

It is the object of the invention to provide a construction of this character in which the valve elements are so arranged as to permit the cylinder block including the head portion in which the valve mechanism is received to be cast as an integral structure, the head portion thereof containing the valve mechanism being a machined bore that is a direct extension of the cylinder bore.
It is a further object of the invention to provide a construction as thus set forth in which the valve mechanism may be readily removed and inspected.

It is a still further object of the invention to so improve the construction of the valve mechanism as to provide a structure adapted to withstand an appreciable increase of temperature and which is designed to operate as efficiently at high engine speeds as at low speeds. It is also an object of the invention to provide a construction which will permit of a wide range of port area ratio in comparison to the bore and stroke of the engine, and also to provide a structure which will be silent in operation and of increasing efficiency with continued use.

Further objects of the invention will be readily understood from the following description of the accompanying drawings, in which—

Figure 1 is a side elevation of a portion of an engine showing, in longitudinal section upon the line 1—1 of Fig. 2, one unit of the engine.
Fig. 2 is a longitudinal section on the line 2—2 of Fig. 1.

Fig. 3 is a plan view of one end of the engine showing the cap or dust guard broken away to show the valve mechanism.

Figs. 4, 5 and 6 are transverse sections on the lines 4—4, 5—5 and 6—6 respectively of Fig. 2.

Fig. 7 is a fragmentary longitudinal section through the upper portion of the cylinder block for one of the engine units.

Fig. 8 is a longitudinal section on the line 8—8 of Fig. 7.

Fig. 9 is a side elevation partly in longitudinal section of the reciprocating sleeve valve for one of the engine units.

Fig. 10 is a top plan view of the same.

Fig. 11 is a side elevation of the stationary sleeve for the valve mechanism of one of the engine units and which is positioned within the reciprocating sleeve valve and surrounding the reciprocating piston valve.

Fig. 12 is a top plan view of the same.

Fig. 13 is a longitudinal section on the line 13—13 of Fig. 11.

Fig. 14 is a perspective view of the portion of the valve shaft for the engine which co-operates with the valve mechanism for one of the engine units.

The improved form of the engine comprises an intermediate casing or block section generally designated at 2, the lower portion of which is provided with base flanges 3 applicable to the flanges 4 of the crank case or basin section 5; the flanges 3 and 4 being secured by bolts or other suitable fastening means 6. Within the block 2 there may be formed one or more piston cylinders 7 spaced from each other within a water jacket or chamber 8 so that the entire cylinder of each of the engine units is surrounded by cooling liquid. Within each cylinder of the engine reciprocates a piston 9 connected by a connecting rod 10 to a respective crank pin 11 of a crank shaft 12 appropriately journaled in the sections 2—5.

Each of the cylinders 7 is provided with an inturned flange 7' that is provided with an upwardly extending cylindrical portion 13 of less diameter than, and preferably alining with, the piston chamber 7 so as to form a chamber 14 for the valve mechanism of the cylinder and in which there is mounted a piston valve 15 in spaced relation from the wall of said chamber. This piston valve is provided with a wrist pin 16 attached by a link 17 to a crank or eccentric portion 18, shown in Fig. 1 as being integral with valve shaft 19 extending along the top of the engine structure and having suitable bearings 20 extending upwardly from the top of the cylinder block.

At approximately the intersection of the cylinder 7 and the reduced cylinder 13 there may be provided a pocket 25 to receive a spark plug 26.

The cylinder 13 is shown as of sufficient length so as to provide for the piston valve 15 during its travel from its lower position, shown in Fig. 2, to the upper or outer position, as determined by its stroke from the crank 18, and as the piston valve 15 moves upwardly from the position in Fig. 2 it is designed to pass an inlet port I and outlet port O provided in cylinder 13. These ports communicate respectively with flues 33 and 34 extending across the water jacket 8 to the outer wall of the cylinder block and preferably cast integral with said cylinder block.

Inlet and exhaust manifold pipes 33' and 34' may be connected to the cylinder block so as to communicate with the inlet and exhaust flues respectively, as by bolts 21, and a dust cap 22 is, preferably, received over the valve shaft 19 and suitably connected to the cylinder block as by bolts $21^a$. Bearing caps 23 co-operate with bearings 20 and may be secured thereto by bolts $21^b$.

A sleeve valve 27 slidably fits within cylinder 13 in an annular space 28 formed by a stationary sleeve 29 spaced within cylinder 13 and surrounding piston valve 15 so that the latter slidably fits therein. The sleeve 29 is provided at its upper end with an annular flange 29' adapted to be received against the head of the cylinder block for supporting said sleeve, said flange being, preferably, bolted to the cylinder head by bolts $21^c$. The stationary sleeve is provided with inlet and exhaust ports $I^2$ and $O^2$ in alinement with inlet and exhaust flues 33 and 34 respectively, and each of these ports is, preferably, divided longitudinally by a reinforcing bridging wall 30.

The sleeve valve 27 has at its upper end an outwardly extending wrist pin 27' on which is pivoted a short connecting link 35 connected to wrist pin or crank 36, shown in Fig. 14 as formed in the valve shaft 19; the wrist pin 36 being arranged at one side of the crank part 18 connected to the connecting rod 17 of the piston valve. The crank 18 is shown in Fig. 14 as set in advance of the crank 36 90° in the direction of rotation of the valve shaft, and this shaft is driven at a ratio of 1 to 2 of the engine crank shaft 12 by a train of gears including a gear 37 secured at one end of the shaft 19 and meshing with a pinion 38 which is one-half the size of gear 37 and is secured on the upper end of a shaft 39 provided with suitable journaling part 40 attached to the body section 2. The lower end of the shaft 39 carries a pinion 41 engaging a complementary pinion 42 of equal size and that is secured on the adjacent end of the crank shaft 12. It is understood that any suitable timing and driving means may be used to connect the crank shaft 12 with the valve shaft 19.

The sleeve valve 27 is shown as provided with an inlet port $I^3$ on one side and on the opposite side is provided with an outlet port $O^3$ above the inlet port, these ports being relatively offset longitudinally a distance about equal to the width of the inlet and outlet ports I and O. The inlet and exhaust ports $I^3$ and $O^3$ are, preferably, divided longitudinally by reinforcing bridging walls 30'.

Suitable packing means are provided between the various movable parts, as for example packing rings 43 in sleeve valve 27, in stationary sleeve 29, and in piston valve 15 respectively.

Operation of the engine is as follows:

Starting with the piston 9 at top center, assuming there is a charge of new gas compressed in chamber 14, the spark occurs and as the piston 9, from the expansion of the burning gases, moves downwardly, the edge of the valve piston 15 moves upwardly from the position indicated by A to a position indicated by B, and the lower edge of the exhaust port $O^3$ in the sleeve 27 moves from a position indicated by D to a position indicated by F, and the lower edge of the intake port $I^3$ of the sleeve moves from a position indicated by G to a position indicated by K when the working piston 9 has reached the lower dead center after completing the expansion stroke.

As the working piston 9 starts to move upward the lower edge of the valve piston 15 begins to uncover the ports $I^2$ and $O^2$ of sleeve 30 allowing the exhaust gases to escape from the combustion chamber 14. At this moment it will be seen the exhaust port $O^2$ is in full registration with the port O, hence, the escape of the exhaust gases into the exhaust passage 34. When working piston 9 reaches the top dead center, completing the second or scavenging stroke of the four cycle operation, the head of the valve piston 15 will have reached a point indicated by C, two strokes of the working piston 9 being made to one stroke of the valve piston 15, thus leaving the ports $I^2$ and $O^2$ fully uncovered and open to the combustion chamber 14. At this position of the working piston 9 and the valve piston 15, the lower edge of the exhaust port $O^3$ of the sleeve 27 has reached a point indicated by D cutting off the registration of the exhaust port $O^2$, and the lower edge of the intake port $I^3$ of sleeve 27 has again reached a position indicated by G.

As the working piston 9 moves downward on the admission stroke the head edge of the valve piston 15 also moves downward, and the intake port $I^3$ of the sleeve moves upward, registering the intake manifold port I, hence the registration or direct passage for the intake charge, from intake manifold 33 into the combustion chamber. As the working piston reaches the end of the outward stroke or lower dead center, completing the third stroke of the cycle of operation, the head edge of the valve piston 15 will have again reached the position indicated by B, closing or cutting off the registration with the combustion chamber, and the lower edge of the exhaust port O³ of sleeve 27 will have reached a position indicated by E, and the lower edge of the intake port I³ of the sleeve will have reached a position indicated by H, permitting the full flow of the intake charge through the stationary sleeve 30 and into the combustion chamber until cut off by the valve piston 15.

When the working piston 9 has reached the inner dead center completing the fourth stroke of the cycle of operation, and having compressed the new charge within the combustion chamber, then the head of the piston valve 15 will be again in a position indicated by A and the lower edge of the exhaust port O³ of the sleeve will have returned to the position indicated by D and the lower edge of the port I³ of the sleeve will have returned to the position indicated by G, thereby closing both the intake and exhaust ports, so that the ports are in position for repetition of the cycle of operation.

Various changes may be made without departing from the spirit of the invention as claimed.

What is claimed is:

1. In an internal combustion engine, a main cylinder, a secondary cylinder projecting from one end of said main cylinder, said secondary cylinder being smaller in diameter than the main cylinder and having the same internal diameter throughout its length, said smaller cylinder being provided with oppositely disposed inlet and exhaust ports, a sleeve valve arranged for reciprocation within the smaller cylinder and having ports in different planes that are adapted to register with the inlet and exhaust ports in the smaller cylinder, a sleeve fixed to the end of the smaller cylinder and extending into the sleeve valve, which sleeve is provided with oppositely disposed ports that are positioned in direct alinement with the inlet and exhaust ports in the smaller cylinder, a piston arranged for reciprocatory movement within the sleeve for controlling the ports therein, a shaft journaled adjacent to the outer end of the smaller cylinder, which shaft is provided with cranks that are arranged at right angles to each other, a connection between the piston and one of said cranks and a connection between the sleeve valve and the other crank.

2. In an internal combustion engine, a main cylinder, a secondary cylinder projecting from one end of said main cylinder, said secondary cylinder being smaller in diameter than the main cylinder and having the same internal diameter throughout its length, said smaller cylinder being provided with oppositely disposed inlet and exhaust ports, a sleeve valve arranged for reciprocation within the smaller cylinder and having ports in different planes that are adapted to register with the inlet and exhaust ports in the smaller cylinder, a sleeve fixed to the end of the smaller cylinder and extending into the sleeve valve, which sleeve is provided with oppositely disposed ports that are positioned in direct alinement with the inlet and exhaust ports in the smaller cylinder, a piston arranged for reciprocatory movement within the sleeve for controlling the ports therein, a shaft journaled adjacent to the outer end of the smaller cylinder, which shaft is provided with cranks that are arranged at right angles to each other, a connection between the piston and one of said cranks, a connection between the sleeve valve and the other crank, a piston in the first mentioned cylinder, a crank shaft arranged for operation adjacent to the outer end of said first mentioned cylinder, and a connection from the last mentioned piston to said crank shaft.

3. In an internal combustion engine, a main cylinder, a secondary cylinder projecting from one end of said main cylinder, said secondary cylinder being smaller in diameter than the main cylinder and having the same internal diameter throughout its length, said smaller cylinder being provided with oppositely disposed inlet and exhaust ports, a sleeve valve arranged for reciprocation within the smaller cylinder and having ports in different planes that are adapted to register with the inlet and exhaust ports in the smaller cylinder, a sleeve fixed to the end of the smaller cylinder and extending into the sleeve valve, which sleeve is provided with oppositely disposed ports that are positioned in direct alinement with the inlet and exhaust ports in the smaller cylinder, a piston arranged for reciprocatory movement within the sleeve for controlling the ports therein, a shaft journaled adjacent to the outer end of the smaller cylinder, which shaft is provided with cranks that are arranged at right angles to each other, a connection between the piston and one of said cranks, a connection between the sleeve valve and the other crank, a piston in the first mentioned cylinder, a crank shaft arranged for operation adjacent to the outer end of said first mentioned cylinder, a connection from the last mentioned piston to said crank shaft, and driving connections between the two crank shafts whereby the valve operating crank shaft is driven at half the speed of the crank shaft that is connected to the piston in the main cylinder of the engine.

4. In an internal combustion engine, a cylinder casting comprising a main cylinder having a uniform diameter throughout its length, a smaller secondary cylinder extending from one end of said main cylinder, the internal diameter of which secondary cylinder is uniform throughout its length, the walls of both cylinders being provided with cooling fluid chambers, there being oppositely disposed inlet and exhaust ports formed through the wall of the secondary cylinder, crank shaft bearings formed integral with the outer end of the secondary cylinder, and there being a spark plug pocket formed in the wall of the cylinder casting adjacent to the inner end of the secondary cylinder.

5. In an internal combustion engine, a cylinder casting comprising a main cylinder, the internal diameter of which is uniform throughout its length, a smaller secondary cylinder projecting from one end of said main cylinder, the internal diameter of which secondary cylinder is the same throughout its length, there being an internal shoulder formed between the adjacent ends of the chambers in the two cylinders, the walls of said cylinders being provided with cooling fluid chambers, there being oppositely disposed inlet and exhaust ports formed through the wall of the secondary cylinder, crank shaft bearings formed integral with the outer end of the secondary cylinder, and there being a spark plug pocket formed in the wall of the cylinder casting immediately above said internal shoulder.

6. In an internal combustion engine, a cylinder casting comprising a main cylinder having a uniform diameter throughout its length, a smaller secondary cylinder extending from one end of said main cylinder, the internal diameter of which secondary cylinder is uniform throughout its length, the walls of both cylinders being provided with cooling fluid chambers, there being oppositely disposed inlet and exhaust ports formed through the wall of the secondary cylinder, crank shaft bearings formed integral with the outer end of the secondary cylinder, there being a spark plug pocket formed in the wall of the cylinder casting adjacent to the inner end of the secondary cylinder, an open end sleeve arranged in the upper portion of the smaller cylinder and spaced apart from the wall thereof, which sleeve is provided with ports that register with the ports in said secondary cylinder and sleeve arranged for reciprocating movement between said first mentioned sleeve and the wall of the secondary cylinder, which reciprocating sleeve is provided with ports that are adapted to register with the ports in the first mentioned sleeve and in the secondary cylinder, and a piston arranged for reciprocatory movement within the first mentioned sleeve.

7. In an internal combustion engine, a cylinder casting comprising a main cylinder having a uniform diameter throughout its length, a smaller secondary cylinder extending from one end of said main cylinder, the internal diameter of which secondary cylinder is uniform throughout its length, the walls of both cylinders being provided with cooling fluid chambers, there being oppositely disposed inlet and exhaust ports formed through the wall of the secondary cylinder, crank shaft bearings formed integral with the outer end of the secondary cylinder, there being a spark plug pocket formed in the wall of the cylinder casting adjacent to the inner end of the secondary cylinder, an open end sleeve arranged in the upper portion of the smaller cylinder and spaced apart from the wall thereof, which sleeve is provided with ports that register with the ports in said secondary cylinder and sleeve arranged for reciprocating movement between said first mentioned sleeve and the wall of the secondary cylinder, which reciprocating sleeve is provided with ports that are adapted to register with the ports in the first mentioned sleeve and in the secondary cylinder, a piston arranged for reciprocatory movement within the first mentioned sleeve, a piston arranged for operation within the main cylinder, and means for imparting movement to the reciprocating sleeve and to the piston within the first mentioned sleeve in proper time relation to each other and to the movements of the piston in the main cylinder.

In testimony whereof I have signed my name to this specification.

EVERETT R. BURTNETT.